United States Patent
Kronseder

Patent Number: 5,257,888
Date of Patent: Nov. 2, 1993

[54] APPARATUS FOR CRATING AND UNCRATING CONTAINERS

[76] Inventor: Hermann Kronseder, Regensburger Strasse 42, D-8404 Woerth/Donau, Fed. Rep. of Germany

[21] Appl. No.: 789,984

[22] Filed: Nov. 12, 1991

[30] Foreign Application Priority Data

Nov. 13, 1990 [JP] Japan ................................. 4036038
Aug. 2, 1991 [DE] Fed. Rep. of Germany ....... 4125573

[51] Int. Cl.$^5$ ........................ B65B 21/18; B65D 5/08
[52] U.S. Cl. ........................... 414/416; 53/247; 294/65
[58] Field of Search ............... 414/416; 294/65; 198/471.1, 474.1, 475.1, 476.1; 53/247, 251

[56] References Cited

U.S. PATENT DOCUMENTS

| | | | |
|---|---|---|---|
| 1,455,014 | 5/1923 | Anderson | 198/475.1 X |
| 3,026,989 | 3/1962 | Schaltegger | 198/471.1 |
| 3,252,588 | 5/1966 | Altenburger | 198/471.1 X |
| 4,044,659 | 8/1977 | Bardenhagen et al. | 198/474.1 X |
| 4,050,574 | 9/1977 | Chenevard et al. | 198/474.1 X |
| 4,558,778 | 12/1985 | Cristiani | 198/471.1 |
| 4,574,818 | 3/1986 | Pagnoni | 198/475.1 X |
| 4,643,633 | 2/1987 | Lashyro | 198/474.1 X |
| 4,662,925 | 5/1987 | Thimons et al. | 294/65 X |
| 4,902,192 | 2/1990 | Ziegler | 198/476.1 |
| 5,105,931 | 4/1992 | Lashyro | 198/471.1 |

FOREIGN PATENT DOCUMENTS

1087967 8/1960 Fed. Rep. of Germany.

Primary Examiner—David A. Bucci
Attorney, Agent, or Firm—Finnegan, Henderson, Farabow, Garrett & Dunner

[57] ABSTRACT

A apparatus for packing or unpacking containers, particularly bottles, into and from carrying crates, respectively, including a rotation element mounted for rotation about a horizontal axis and having suspended therefrom, in the manner of gondolas and at locations spaced from its axis of rotation, a number of container pickup heads adapted to repeatedly travel through a closed loop path including a pickup position and a grip release position. Each container pickup head is connected to the rotation element by a suspension device permitting the pickup head to move relative to the rotation element in a substantially vertical plane, and a drive and control mechanism is provided for the movement of the pickup heads relative to the rotation element in a manner to generate the loop path in a desired configuration.

31 Claims, 7 Drawing Sheets

APPARATUS FOR CRATING AND UNCRATING CONTAINERS

BACKGROUND OF THE INVENTION

The invention relates to an apparatus for crating or uncrating groups of containers, comprising a rotation element mounted for rotation about a substantially horizontal axis and having mounted thereon at locations spaced from said axis of rotation, container pickup heads for repeatedly travelling through a closed loop path from a pickup position to a grip release position.

Apparatus of this type is preferably employed in the beverage industry for placing groups of bottles in carrying crates or for emptying such carrying crates. In this environment it is of importance that the bottles and crates are carefully handled, although the desirably high output of the packing operation requires high conveyance speeds resulting in strong acceleration and deceleration forces acting on the bottles. Of particular importance is the avoidance of bottle breakage which would otherwise result in frequent interruptions of the operation.

A container packing or crating apparatus of the type defined above is known from DE-PS 10 87 967. This apparatus comprises three pickup heads suspended on a rotation element in the manner of a gondola for travelling in a vertical plane, the pickup heads being suspended from rails or pivot arms laterally projecting from the rotation element so as to permit horizontal displacement of the pickup heads in addition to their travel in a vertical plane. A pickup position and a grip release position, respectively, are provided in the lowermost position of the pickup heads. For the purpose, for instance, of placing bottles in a carrying crate, a pickup head is moved to its lowermost position for engaging bottles supplied to this pickup position. In the course of a full revolution of the rotation element, the respective pickup head is horizontally displaced so as to position it above a conveyor path extending adjacent the bottle feeding path and along which a carrying crate to be filled is supplied. In order to permit the pickup head to pick up another group of bottles after having placed its bottles in the carrying crate, it has to perform a further full revolution of 360°, in the course of which it is returned in the horizontal direction for alignment above the bottle feeding conveyor. This known apparatus for crating containers thus suffers from the disadvantage that the crating speed is reduced by the requirement of a full revolution of the empty pickup head to enable it to pick up a subsequent group of bottles. Since both the pickup and release positions are located at the lowermost positions of the pickup heads, the apparatus requires the provision of two side-by-side conveying paths for the bottles and cases, respectively, resulting in excessive space requirements. In the known apparatus it is finally necessary, moreover, to very accurately synchronize the movement of the crates to be filled with the travelling speed of the pickup heads conveying the bottles, in order to permit the bottles to be accurately placed into respective compartments of the crates.

It is an object of the present invention to propose an apparatus of the type defined in the introduction, which offers considerable improvements over the known prior-art apparatus of this type.

SUMMARY OF THE INVENTION

According to the invention, this object is attained by the provision that each pickup head is connected to the rotation element by suspension means permitting movements of the pickup head relative to the rotation element in a substantially vertical plane, and that a drive and control mechanism is provided for the movement of the pickup heads relative to the rotation elements in a manner to generate a loop path of the desired shape.

This solution according to the invention permits the pickup heads to be moved along loop paths of a configuration permitting the transfer of containers to be accomplished between container and crate feeding paths, respectively, disposed above one another. This results in a considerable reduction of the space requirement for the apparatus according to the invention. The pickup of the bottles by a pickup head and the release of the bottles by lowering them into a crate is accomplished in the course of a single revolution of the rotation element, resulting in a considerably increased packing output as compared to that of the known prior-art apparatus, in which two full revolutions of the rotation element are required for the pickup and release of a group of bottles. The apparatus according to the invention finally permits a closed loop path to be generated in such a manner that both the vertical and horizontal displacement speeds of the pickup heads are greatly reduced at their pickup and grip release positions, and a vertical displacement is accomplished in such a manner that any specifically accurate displacement control for the crates or the supplied bottles is not required to ensure a reliable pickup operation or reliable placement of the bottles in the crate. In particular, the invention eliminates the necessity of accelerating the supplied bottles to synchronize their feeding speed with the revolving speed of the pickup heads, and of forming groups of bottles to be crated. The bottle feeding operation may rather be continuous, with the pickup heads always acting to pick up the foremost bottles of the supplied bottle column. At the location of the pickup position and the grip release position, respectively, a pickup head may in particular be caused to perform a certain dipping movement permitting the bottles to be lowered into individual compartments of a carrying crate without being dropped from any appreciable height.

According to an advantageous aspect of the invention, the apparatus is provided with means for the parallel guidance of the pickup heads in a horizontal attitude. This parallel guidance means is advantageously effective to prevent the pickup heads, which are suspended in the manner of gondolas, from being induced to swing in the course of the crating operation, as such pendulum-like swinging would otherwise impair the reliable pickup of the bottles and/or their being properly lowered into the crates.

In a preferred embodiment of the invention, the suspension means comprises a pivot arm, and the drive and control mechanism includes a cage gear transmission, the desired configuration of the loop path being achieved by a suitable construction of the toothed path of the cage gear transmission. The toothed path of the cage gear transmission is stationary, and engaged by a cage gear connected to a shaft mounted on the rotation element and operatively connected through transmission means to another shaft itself connected to the pivot arm.

The rotation element is preferably designed as a rotary disc having three of four pickup heads mounted thereon, the connection points of the associated pivot arms being located at equal spacings from the axis of rotation of the rotary disk, and at equal angular spacings from one another.

According to another preferred embodiment of the invention, the suspension means comprises two pivot arms, one of the two pivot arms being provided with a cam follower element in engagement with a stationary cam groove, the other pivot arm being connected to the rotation element through a two-part auxiliary linkage. One of the two members of the auxiliary linkage is provided with a cam follower element in engagement with a second stationary cam groove. The positive guidance of the cam follower elements in the stationary cam grooves is effective to impart a separate movement to the pickup heads in addition to their circulation movement produced by the rotation element. The composition of the suspension means of two hinged members offers additional possibilities with a view to achieving an optimum configuration of the pickup head loop path.

BRIEF DESCRIPTION OF THE DRAWINGS

Embodiments of the invention shall now be described and explained in more detail by way of example with reference to the accompanying drawings, wherein.

DETAILED DESCRIPTION OF THE INVENTION

Figure 1:
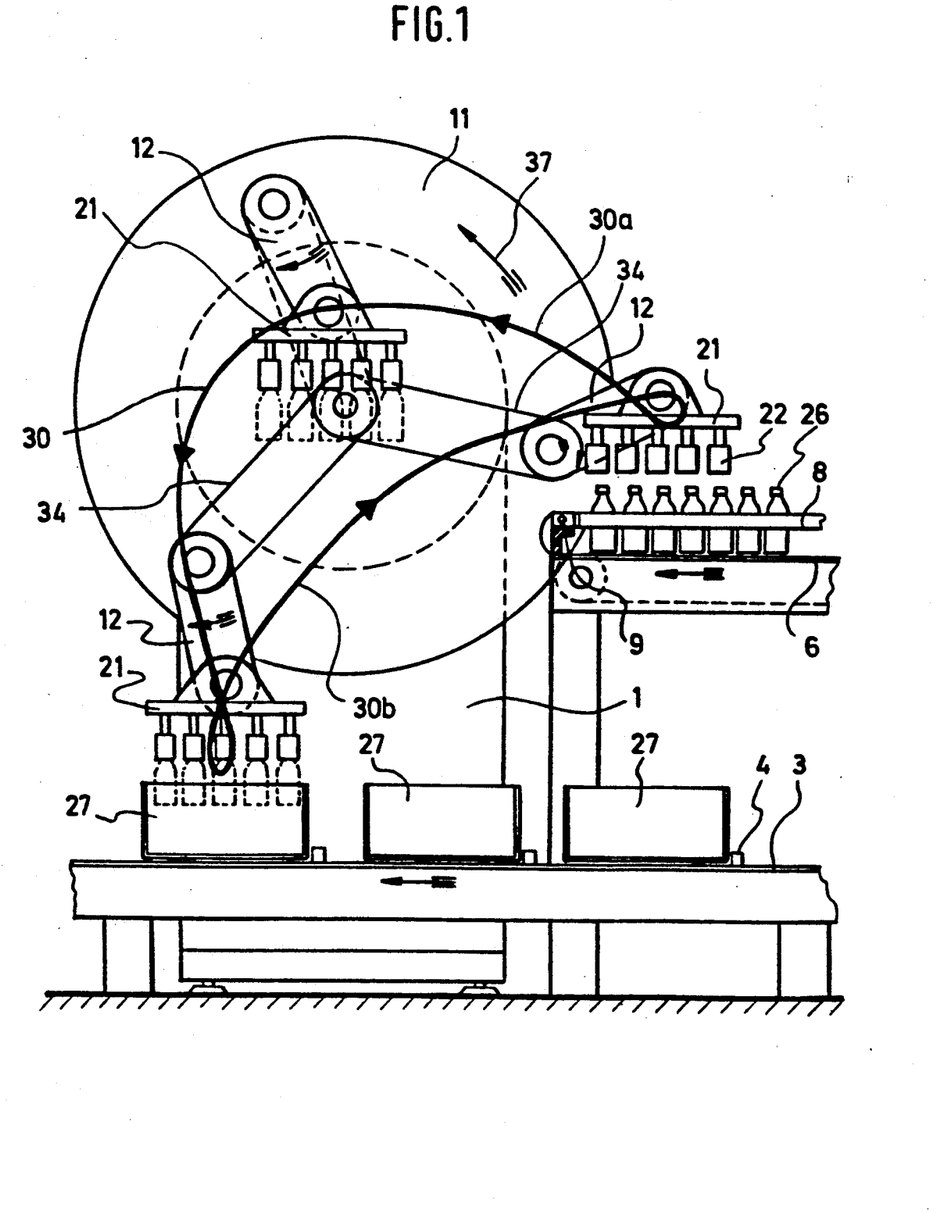
FIG. 1 shows a lateral elevation of a container crating apparatus according to an embodiment of the invention.
Figure 2:
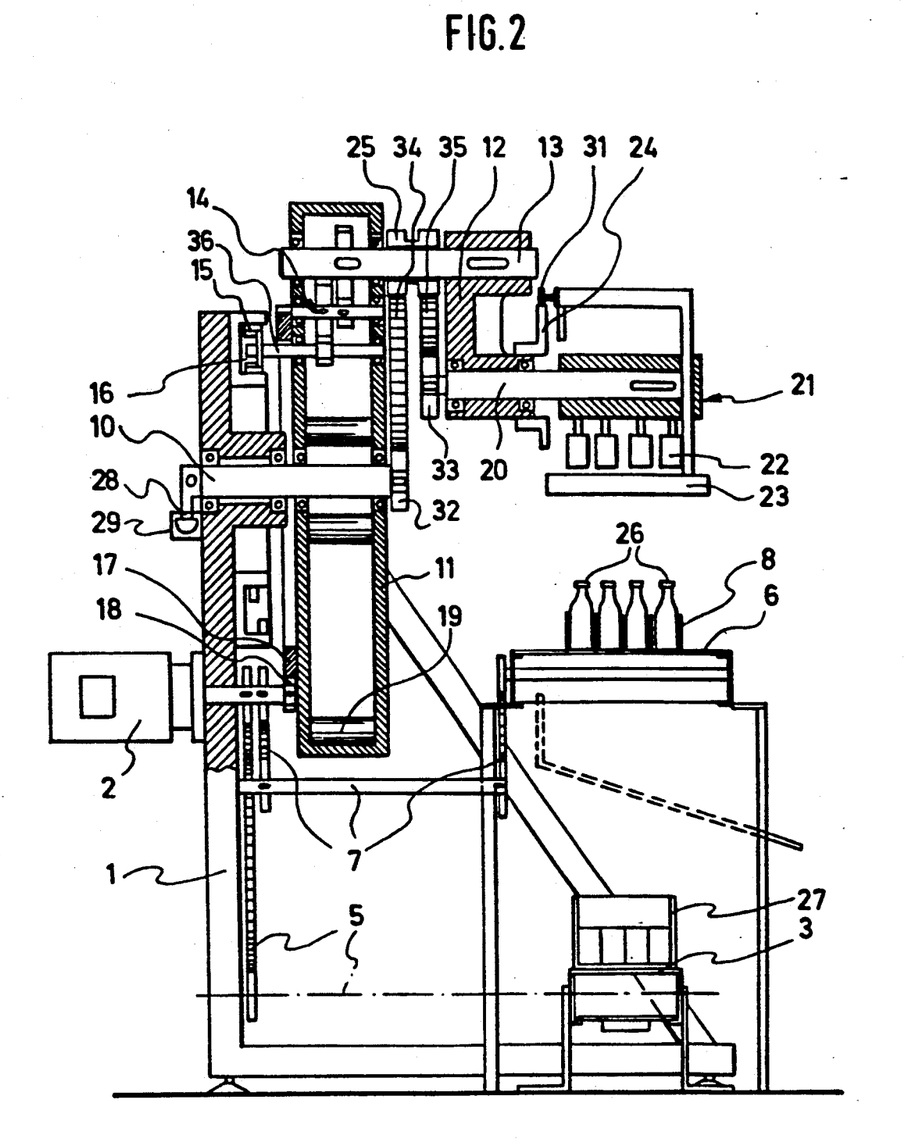
FIG. 2 shows an end view of the embodiment of FIG. 1 as rotated about 90°.

Indicated at 1 in FIGS. 1 and 2 is a machine frame having a rotor 11 mounted thereon for rotation about a fixed axle 10, the latter being prevented from rotating relative to frame 1 by a cam member 28 engaging a safety switch 29. Rotor 11 is designed in the form of a hollow rotary disc with its internal space containing a plurality of gear transmissions of which only one is shown at 14. A detailed description of the gear transmissions will be given hereinafter. A lubricant pool 19 is formed in the lower portion of the internal space of rotor 11. A motor-transmission unit 2 for rotating rotor 11 comprises a pinion gear 18 camming with a gear rim 17 connected to rotor 11. Mounted in rotor 11 at equal spacings from its axis of rotation and equal angular spacings from one another are three shafts, one of which is indicated at 13 in FIG. 2. Fixedly connected to each shaft 13 is a pivot arm 12 carrying a respective pickup head 21 hinged to its free end. Pickup head 21 is rigidly connected to a shaft 20 rotatably mounted in pivot arm 12. In the present example, pickup head 21 comprises a plurality of pneumatically operable pickup cups 22 and is provided with a centering frame 23 mounted for vertical displacement relative to pickup head 21 under the control of a lift cam disc 24, the latter being rigidly connected to pivot arm 12. Travelling on lift cam disc 24 is a roller 31 connected to centering frame 23.

Rigidly mounted on fixed shaft 10 is a sprocket or pinion 32 operatively connected by a transmission element, for instance a timing belt, to another sprocket or pinion 25 rotatably mounted on shaft 13. Pinion 25 is formed as a twin pinion operatively connected by a further transmission element 35 to a pinion 33 fixedly mounted on shaft 20. Pinions 32, 25 and 33 have identical numbers of teeth.

Mounted in rotor 11 is a number of shafts 36 corresponding to the number of shafts 13, with respective ones of shafts 36 and 13 being operatively interconnected by a gear transmission 14. Each shaft 36 is rigidly connected to a cage gear 15 extending into a stationary annular groove 16 provided on one or both of its sidewalls with rows of teeth for cooperation with cage gear 15.

Indicated at 7 is a transmission mechanism operatively connecting motor-transmission unit 2 to a bottle feeding conveyor 6 operable to feed bottles 26 between lateral guide rails 8 into engagement with a stationary or entrainable stop device 9. Reference numeral 5 designates a similiar transmission mechanism operatively connecting motor-transmission unit 2 to a conveyor 3 provided with pusher members 4 for the conveyance of crates 27.

As rotor 11 is being rotated, shafts 13 and 36 are moved along a circular path in accordance with their mounting arrangement on rotor 11, causing shafts 36 to be put in rotary motion as a result of the engagement of cage gears 15 rigidly connected thereto with the rows of teeth provided in annular groove 16. Gear transmission 14 acts to transmit the rotation of the respective shaft 36 to the associated shaft 13, as a result of which the pivot arm 12 rigidly connected to shaft 13 performs a movement relative to rotor 11 in a vertical plane, in addition to its circular movement caused by the rotation of rotor 11. In the embodiment illustrated in FIGS. 1 and 2, the rows of teeth on the sidewalls of guide groove 16 are arranged in such a manner that each pickup head 21 describes the loop path indicated at 30 in FIG. 1.

The drive-transmitting connection between pinion 32 and pinion 33 established via transmission element 34, twin pinion 25 and transmission element 35 is effective to ensure that each pickup head 21 retains its constant attitude as rotor 11 is being rotated, the apparatus being devised in such a manner that each pickup head 21 remains in horizontal alignment irrespective of its actual position on loop path 30. The constant horizontal alignment of the pickup heads results in the bottles carried thereby always being maintained in the vertical position, the movements of pivot arms 12 causing roller 31 of centering frame 23 to travel on lift cam disc 24 associated to the respective pivot arm, so that centering frame 23 is displaced in the vertical direction relative to pickup head 21 in accordance with the shape of lift cam disc 24. The shape of lift cam disc 24 is selected so that centering frame 23 is displaced downwards immediately prior to the bottles being lowered into a crate to align the crate in a predetermined position for the bottles to be lowered thereinto.

By suitably selecting the arrangement of the teeth rows in groove 16 it is possible to provide a great variety of closed loop paths, the path indicated at 30 in FIG. 1 serving as an example. As rotor 11 is being rotated in the direction indicated by an arrow 37 in FIG. 1, pivot arms 12 are moved relative thereto in such a manner that a pickup head 21, immediately after having picked up a group of bottles 26 from bottle feed conveyor 6, is carried along a section 30a of loop path 30 to a position above a carrying crate 27 suitably aligned in the release position, by a pivotal displacement of pivot arm 12 in the direction opposite to the direction of rotation of rotor 11. Immediately above carrying crate 27, path 30 describes a dipping loop, causing pickup head 21 to be lowered for cautiously depositing the bottles in crate 27 without dropping them from any appreciable height. At this location of the loop path, both the horizontal and the vertical speed components of pickup head 21 are considerably reduced, while over the major part of the closed loop path the bottles may be conveyed at a considerably higher speed from the pickup position to the release position, so as to achieve a high operating frequency. By suitably controlling the movements of pivot arms 12, it is thus possible to ensure that excessive acceleration and deceleration forces are avoided immediately upstream and downstream of the pickup and release positions. After a pickup head 21 has deposited its bottles in a crate, the respective pivot arm is moved relative to rotor 11 in such a manner that the pickup head moves along section 30b of the loop path 30, this movement again resulting from the pivotal movement of the pivot arm opposite to the direction of rotation of the rotor. As the respective pickup head travels along loop path section 30b it passes above stop 9 and is subsequently lowered onto the bottles 26 to be picked up. During this bottle pickup operation, both the next group of horizontal and the vertical speed components of the pickup head are again considerably reduced relative to the speed along the remainder of the loop path. After the bottles have been picked up, the pickup head repeats its travel along the loop path in the manner described.

In the crating apparatus depicted in FIGS. 1 and 2, each full revolution of rotor 11 results in each of the three pickup heads 21 filling a respective crate 27, so that a high crating speed is achieved. By suitably controlling the movements of pivot arms 12 relative to rotor 11 it is possible to execute the crating operation without the occurrence of strong acceleration and deceleration forces; this ensures careful handling of both the goods to be packed and the packing containers, and is also advantageous with regard to wear and tear of the apparatus itself.

Figures 3, 4:
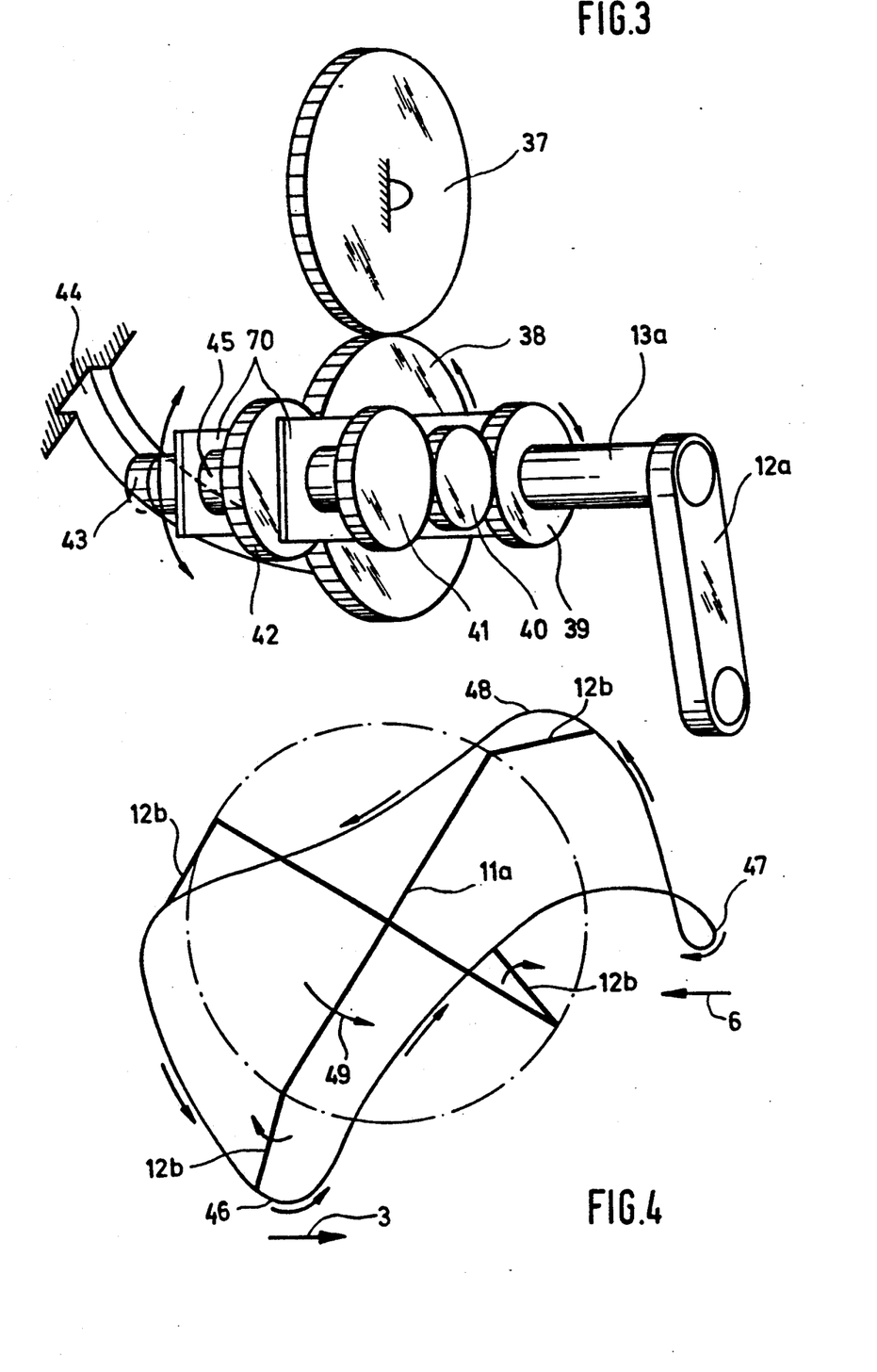
FIG. 3 shows an embodiment of a drive mechanism associated to a pivot arm.
FIG. 4 shows an example of a loop path along which a pickup head of the apparatus according to the invention may be moved.

Illustrated in FIG. 3 is a drive mechanism for a pivot arm 12a which may be employed in place of the drive mechanism shown in FIGS. 1 and 2 and including gear transmission 14 and the cage gear mechanism. Components corresponding to similar ones in FIGS. 1 and 2 are therefore designated in FIG. 3 by the same reference numerals with added index a.

The drive mechanism of FIG. 3 comprises a stationary gear 37 which would have to be mounted concentrically with axle 10 in the apparatus shown in FIGS. 1 and 2. Camming with stationary gear 37 is another gear 38 rotatably mounted on a shaft 13a itself mounted on a rotor not illustrated in FIG. 3. Gear 38 cams with a still further gear 42 rigidly mounted on a shaft 45. Also rigidly connected to shaft 45 is another gear 41 operatively connected by an idler gear 40 to still another gear 39 fixedly mounted on shaft 13a, the latter being again fixedly connected to pivot arm 12a. Gear 39 and thus pivot arm 12a are rotatable relative to gear 38. At its end opposite from gear 41, shaft 45 carries a cam follower element in the form of a roller 43 in engagement with a groove 44. As groove 16 in FIGS. 1 and 2, groove 44 is stationary and forms a closed loop of, in contrast to groove 16, a non-circular configuration. Shaft 45 and idler gear 40 are rotatably mounted in a carrier arm 70 itself rotatably mounted on shaft 13a.

The rotation of the rotor (not shown in FIG. 3) cause gear 38 to revolve around fixed gear 37 to thereby rotate gear 42, the rotation of which is transmitted via gear 41 and idler gear 40 to gear 39 rigidly connected to shaft 13a and pivot arm 12a. At the same time, the rotation of the rotor causes roller 43 to be positively guided in groove 44. This is effective to control the rotation of shaft 13a and thus of pivot arm 12a due to the non-circular configuration of groove 44, as a result of which the gear mechanism shown acts as a differential gear mechanism.

Another possible configuration of the closed loop path for a pickup head is illustrated in FIG. 4. This closed loop path could be generated by means of both the pivot arm drive mechanism illustrated in FIGS. 1 and 2 and the gear mechanism according to FIG. 3. FIG. 4 shows a rotor 11a designed to operate four pickup heads with the aid of four pivot arms 12b. Reference numerals 47 and 46 designate a bottle pickup position and a release position, respectively. In contrast to the loop path depicted in FIG. 1, the FIG. 4 embodiment does not comprise a dip loop section at the release position. As in the loop path according to FIG. 1, however, both the horizontal and vertical speed components of the pickup heads are considerably reduced adjacent the pickup and release positions as compared to the speed along the remainder of the loop path.

Figure 5:
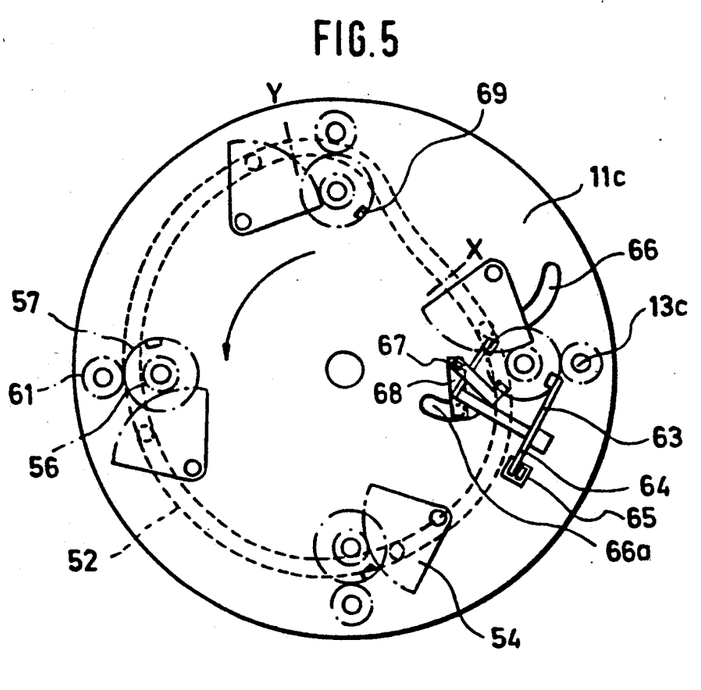
FIG. 5 shows another embodiment of a rotation element for use in the apparatus according to the invention.
Figure 6:
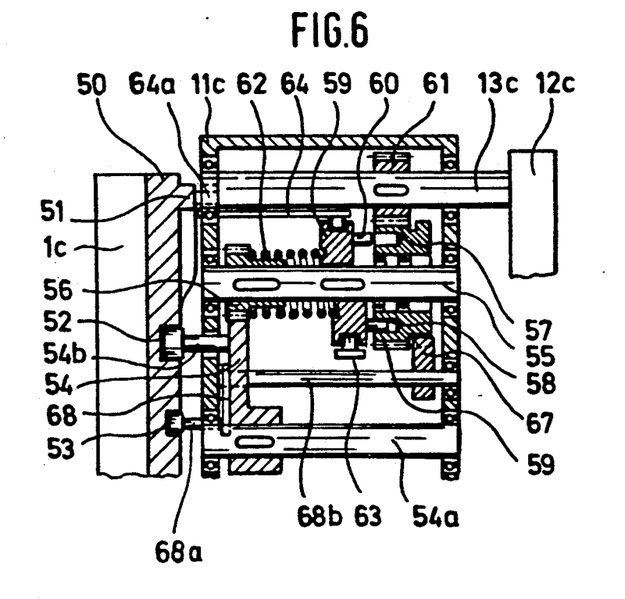
FIG. 6 shows a drive element for the movement of the pickup heads relative to the rotation element as employed in the embodiment according to FIG. 5.

Shown by way of example in FIGS. 5 and 6 is another possibility of accomplishing the movement of individual pickup heads relative to a rotor 11c. The illustrated mechanism includes gears 61 connected to shafts 13c mounted on rotor 11c and themselves connected to pivot arms 12a. In the present embodiment the apparatus is provided with four gears 61, and accordingly with four pivot arms for carrying four pickup heads (not shown in FIGS. 5 and 6). Gears 61 are in engagement with other gears 57 rotatably mounted on shafts 55 themselves rotatably mounted on rotation element 11c. A clutch disc 59 is slidably mounted on shaft 55 adjacent gear 57. Clutch disc 59 is provided with projecting pins 60 for engagement in respective bores of gear 57. Non-rotatably mounted on shaft 55 at a location spaced from clutch disc 59 is a further gear 56. A helical spring 62 has its ends supported on further gear 56 and clutch disc 59, respectively. Gear 56 cams with a sector gear 54 non-rotatably mounted on a shaft 54a itself rotatably mounted on rotation element 11c. Sector gear 54 is provided with a pin member 54b projecting through a slot opening 66 in a wall of the hollow body acting as the rotation element in the present example. The projecting end of pin member 54b carries a roller in engagement with a cam groove 52 formed in a stationary cam ring 50 secured to the machine frame 1c of the apparatus.

Also shown in FIGS. 5 and 6 is a crank lever 64 fixedly connected to a gearshift fork 63 engaged in an annular groove formed in the circumferential surface of clutch disc 59. The end portion of crank lever 64 opposite shift fork 63 projects through an opening 65 in the wall of rotation element 11c and carries a roller 64a in engagement with an axial cam portion 51 formed on cam ring 50.

Reference numeral 68 designates a lever provided at one of its ends with a pin element 68a projecting through an opening 66a in the wall of rotation element 11c and engaged in a further cam groove 53 formed in stationary cam ring 50. The other end of lever 68 is fixedly connected to a shaft 68b having its ends mounted in rotation element 11c. Secured to shaft 68b is another lever 67 having its free end formed as a hook-shaped projecting portion adapted to engage a recess in gear 57.

Spring 62 normally acts to bias clutch disc 59 into engagement of its projecting pins 60 in the bores 58 of gear 57, so that rotary movements transmitted from pin element 54b to sector gear 54 are further transmitted via gear 56, shaft 55, gear 57 and gear 61 to pivot arms 12c, resulting in a suitably controlled movement of the pickup head carried by pivot arm 12c in accordance with the configuration of cam groove 52. The described clutch and locking mechanism is provided to ensure that pivot arm 12c is permitted to rotate in only one direction relative to rotation element 11c, rather than having to perform oscillating movements as the mechanism according to FIGS. 5 and 6 would otherwise permit without the clutch and locking mechanism. At the location designated X, the cam follower roller of pin element 54b of each sector gear 54 has reached its innermost position, whereat the configuration of cam groove is effective to cause locking lever 67 to be engaged with recess 69 in gear 57. At the same time axial cam portion 51 is effective to cause pins 60 to be retracted from bores 58. While pivot arm 12c is thus kept stationary, the roller of sector gear 54 is pivoted to its outermost position. At the location designated Y, the cam follower roller of sector gear 54 has reached its outermost position, pins 60 are reintroduced into bores 58, and locking lever 67 is disengaged from recess 69, so that from this location Y onwards cam groove 52 is again effective to control the movement of pivot arm 12c relative to rotation element 11c.

In the embodiment shown by way of example in FIG. 7, components similar or equivalent to ones described with reference to the preceding embodiments are designated by the same reference numerals with added index d. In this embodiment the rotation element 11d is of cruciform design, and in essential contrast to the embodiments described before, the suspension means for each pickup head comprises two interconnected pivot arms 103 and 104. The inner pivot arm 103 is pivotable relative to rotation element 11d, while the outer pivot arm 104 on its part is pivotable relative to inner pivot arm 103. Also provided are hingedly interconnected auxiliary linkage members 105 and 106, of which linkage member 105 is articulated to rotation element 11d and link member 106 is articulated to outer pivot arm 104, its articulation point in the present example being located radially forwards of the articulation point of inner and outer pivot arms 103 and 104, respectively.

Inner pivot arm 103 is provided with a cam follower element 103a in engagement with a cam groove 101 formed in a stationary cam disc 100 connected to machine frame 1d. Auxiliary linkage member 105 is provided with a cam follower element 105a in engagement with a second cam groove 102 formed in cam disc 100.

As rotation element 11d is being rotated, cam follower elements 103a and 105a are positively guided in grooves 101 and 102, respectively, resulting in additional movement in a vertical plane of the pickup heads 21d relative to the rotation of rotation element 11d, to thereby obtain a suitable loop path 107 for the crating operation. With regard to this additional movement of the pickup heads, the embodiment shown in FIG. 7 offers a wider range of possibilities than the embodiments described before, so that it is possible to obtain a closed loop path of still further improved characteristics with regard to its configuration in space and optimum speed and acceleration values.

Figure 7:
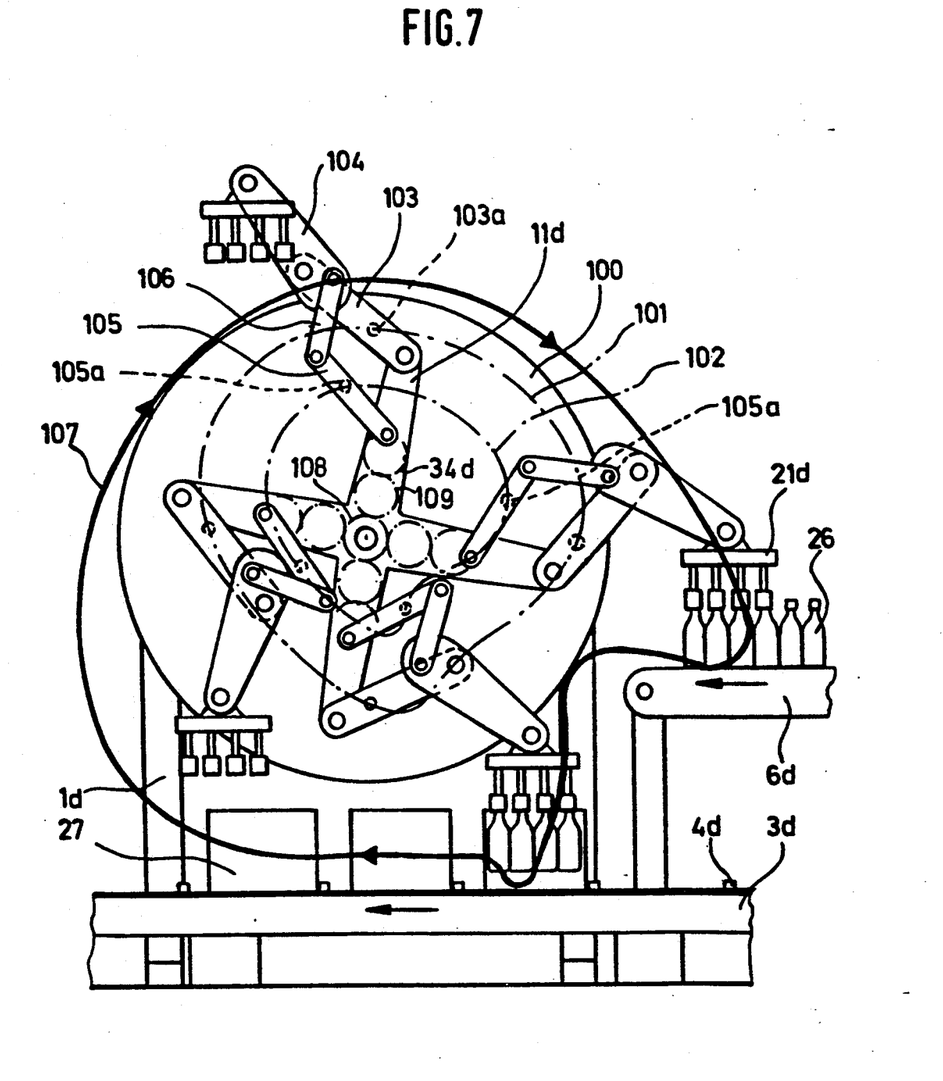
FIG. 7 shows a lateral elevation of another embodiment of an apparatus according to the invention for crating containers, provided with pickup head suspension means each comprising two pivot arms.

The embodiment of FIG. 7 also permits parallel guidance of pickup heads 21d to be achieved by the employ of a stationary pinion in combination with timing belts as in the embodiment of FIG. 2. This would only require the employ of an additional timing belt from the articulation point of the outer and inner pivot arms 104 and 103, respectively, to the articulation point of the pickup head 21d and the outer pivot arm 104, in combination with two additional pinions. A particularly compact construction of the four belt transmissions can be achieved by providing a stationary sun gear 108 concentric with the axis of rotation of rotation element 11d, in camming engagement with four planet gears 109 mounted in the arms of rotation element 11d and operatively connected to the respective drive pinions 34d of the belt transmissions leading to the pickup heads 21d. This arrangement is indicated in FIG. 7 by dash-dotted lines.

In each of the embodiments described previously, the respective apparatus is used for packing groups of bottles 26 in carrying crates 27. By reversing the direction of rotation of the rotation elements 11, 11c, 11d, of the conveyor 6 for the bottles 26, and of the conveyors 3, 3d for the carrying crates 27, the apparatus may be used for removing bottles 26 from crates 27. In the embodiment of FIG. 7, it would additionally be required to reverse the hinged connection of pivot linkage members 103 to 106 to the rotation element 11d mirror-image-wise, to thereby maintain the most suitable conditions for the engagement of rollers 103a, 105a in cam grooves 101 and 102, respectively.

Figure 8:
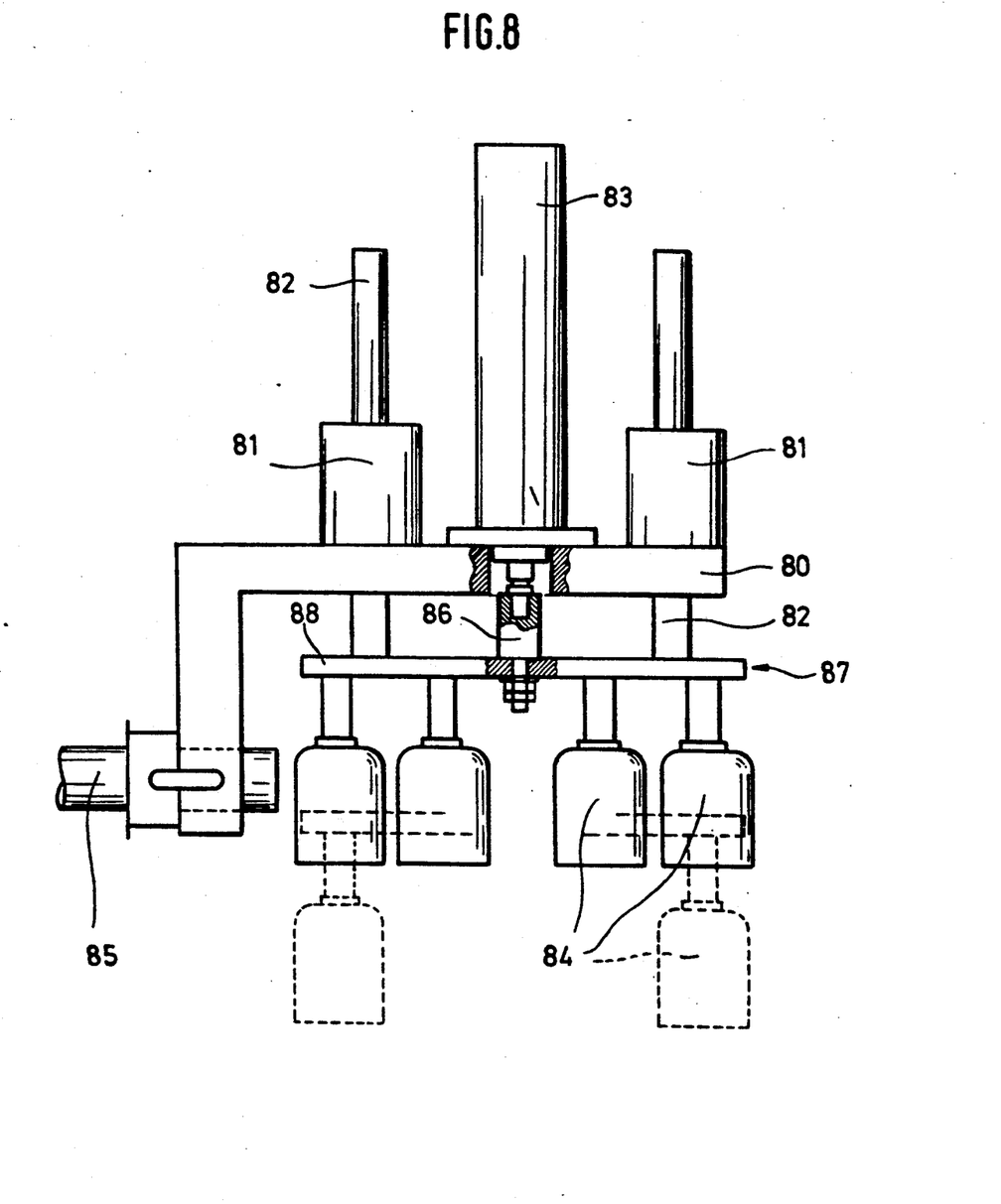
FIG. 8 shows a pickup head provided with means for producing an additional translational movement of the pickup head relative to its suspension means.

In order to permit the configuration of the loop path to be still further varied, it is possible to employ an additionally movable pickup head of the type shown in FIG. 8. Reference numeral 80 in FIG. 8 designates a carrier plate which may be connected by a shaft 85 to suspension means of the type described with reference to the previous embodiments. In the present example, carrier plate 80 is provided with two guide bushings 81 for a pair of guide rods 82 connected to a pickup head 87. Additionally mounted on carrier plate 80 is a pneumatic cylinder 83 having its piston rod connected by an adapted piece 86 to a base plate 88 of pickup head 87. Cup- or bell-shaped pickup elements 84 are attached to base plate 88 of pickup head 87.

During operation of the crating apparatus, the loop path described by pickup head 87 can be additionally varied, particularly in the container pickup and/or release phases, by the activation of pneumatic cylinder 83 for a displacement of pickup head 87 perpendicular to base plate 80. This vertical displacement of the always horizontally guided pickup head should be sufficient to ensure the reliable pickup and/or cautious release of the containers. In FIG. 8, a lowered position of pickup head 87 is indicated by dotted lines. The pneumatic cylinder for producing this additional movement of the pickup head may be controlled by sensors acting to detect the angular position of the rotation element and thus the actual position of each pickup head.

In the above embodiment the displacement is in vertical direction. However, it is also possible to conduct the displacement under use of the same means in a horizontal direction or to carry out a tilted movement around a horizontal axis.

Figure 9:
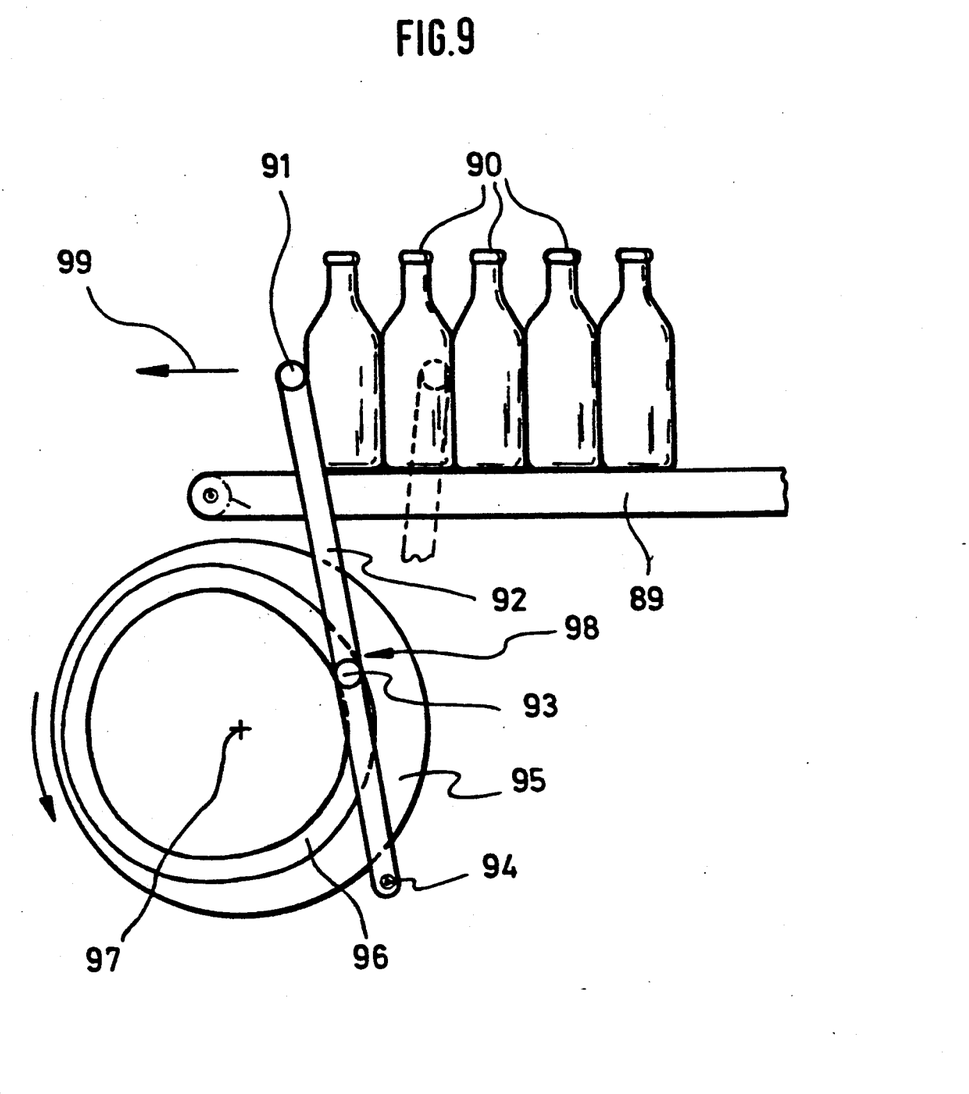
FIG. 9 shows a stop mechanism for the alignment of containers to be picked up by the pickup heads.

In FIG. 9, reference numeral 89 designates a hinged-chain conveyor driven in synchronism with the rotation element for conveying parallel rows of bottles 90 to be crated into engagement with a stop bar 91, the conveying direction being indicated by an arrow 99. Stop bar 91 is formed as part of a pivoting frame 98 having frame legs 92 mounted for pivoting about an axis 94. Secured to at least one frame leg 92 is a pin element 93 engaging a cam groove 96 of cam disc 95 adapted to rotate about an axis 97 in synchronism with the rotation element.

In the course of the crating operation, the conveyed bottles 90 come into engagement with stop bar 91 approximately in the position of pivot frame 98 indicated in dotted lines. At this instant, the forward speed of stop bar 91 as controlled by the rotation of cam disc 95 with its cam groove 96 is somewaht slower than the conveying speed of the bottles, to result in a gentle stopping effect preventing the bottles from being harmed. The further rotation of cam disc 95 subsequently causes stop bar 91 to continue its movement in the direction of arrow 99 at a constant speed. During this phase, conveyor 89 continues to convey the bottles at a constant and somewhat higher speed, so that the bottles 90 are brought into mutual contact for proper alignment. The alignment of the bottles crosswise of the thus formed rows is accomplished by lateral guides not shown in FIG. 9. After the group of bottles have been thus aligned by mutual contact, they can be picked up by a pickup head having a corresponding arrangement of bell-shaped pickup elements. In correspondence to the movement of the pickup heads the rotation of cam disc 95 is controlled in such a manner that at the instant of the pickup operation, the horizontal speed of stop bar 91, and thus of the group of bottles to be picked up, substantially corresponds to that of the pickup head. After the bottles have been picked up by the pickup head, the back pressure exerted by the stop bar may be relieved by accelerating the stop bar in the direction away from the bottles, whereupon it is then returned to its stop position. The sub-unit illustrated in FIG. 9 thus also contributes to a careful and relatively low-noise handling of the bottles during the crating operation.

I claim:

1. Apparatus for the crating or uncrating of groups of containers with respect to crates adapted to hold a group of the containers comprising a rotation element mounted for rotation about a substantially horizontal axis, means for rotating said rotation element about said axis, a plurality of pickup heads for gripping a group of containers radially spaced from said axis and angularly spaced from one another around said rotation element, suspension means pivotally suspending each pickup head from said rotation element, said suspension means causing said pickup heads to rotate with rotation of said rotation element while permitting movement of said pickup heads relative to said rotation element in a substantially vertical plane so that the radial distance between said pickup heads and said axis can be varied and guide means for guiding said pickup heads through a closed loop path between a pickup position for gripping a group of containers and a grip release position for releasing the group of containers as the rotation element rotates, said positions being spaced horizontally and vertically from each other in the same vertical plane.

2. The apparatus of claim 1, wherein the guide means comprises drive elements associated with individual ones of said suspension means.

3. The apparatus of claim 2, wherein said drive elements are mounted on said rotation element.

4. The apparatus of claim 3, wherein each said drive element includes a motor and a gear mechanism.

5. The apparatus of claim 4, wherein said drive elements are operated by the rotation of said rotation element.

6. The apparatus of claim 5, wherein said drive elements comprise actuator elements in engagement with at least one control path.

7. The apparatus of claim 6, wherein said control path is stationary relative to said rotation element.

8. The apparatus of claim 7, wherein said control path comprises a toothed path and said actuator elements a cage gear.

9. The apparatus of claim 7, wherein said control path comprises a cam guide path and said actuator elements a cam follower element.

10. The apparatus of claim 8, wherein said cage gear is connected to a transmission shaft.

11. The apparatus of claim 9, wherein said cam follower element is connected to a shaft of a differential gear mechanism.

12. The apparatus of claim 1, wherein said suspension means comprises a pivot arm pivotally mounted relative to said rotation element and said pickup head.

13. The apparatus of claim 12, wherein the pivot axis of said pivot arm is connected to said guide means for pivoting relative to said rotation element.

14. The apparatus of claim 1, wherein said suspension means comprises a first pivot arm pivotally mounted relative to said rotation element and a second pivot arm pivotally connected between said first pivot arm and said pickup head.

15. The apparatus of claim 14, wherein actuator means are provided for controlling individual movement of said two pivot arms.

16. The apparatus of claim 15, wherein the actuator means for said first pivot arm comprises a cam follower element on said first arm in engagement with a cam guide path in said rotation element.

17. The apparatus of claim 16, wherein said second pivot arm is connected to said rotation element through a two-member linkage, and the actuator means for said second pivot arm comprises a cam follower on the linkage member connected to said rotation element in engagement with a further cam guide path in said rotation element.

18. The apparatus of claim 1, wherein said rotation element is rotatable in one direction.

19. The apparatus of claim 1, wherein said rotation element is a rotary disc.

20. The apparatus of claim 1, wherein said rotation element houses said guide means.

21. The apparatus of claim 1, wherein said container pickup heads are suspended in the manner of a gondola.

22. The apparatus of claim 1, wherein means are provided for keeping said pickup heads in a horizontal orientation as they follow said closed loop path.

23. The apparatus of claim 1, having three pickup heads equiangularly spaced around said rotation element.

24. The apparatus of claim 1, having four pickup heads equiangularly spaced around said rotation element.

25. The apparatus of claim 1, wherein each of said pickup heads is connected to a suspension means by a mechanism for producing a displacement of said pickup head relative to said suspension means.

26. The apparatus of claim 25, wherein said mechanism for producing said displacement includes a pneumatic actuator device.

27. The apparatus of claim 26, wherein said mechanism for producing said displacement comprises guide rods connected to said pickup head, a bracket connected to said suspension means, guide bushings on said bracket for guiding said guide rods and a pneumatic cylinder connected between said pickup head and said bracket for displacement of said pickup head relative to said mounting means.

28. The apparatus of claim 1, including means for feeding containers to said pickup position and a stop mechanism for alignment of said containers to form a group of containers to be picked up by a pickup head at the pickup position.

29. The apparatus of claim 28, wherein said stop mechanism comprises a stop bar adapted to be displaced in the feeding direction of said containers at a speed slightly slower than the container feeding speed.

30. The apparatus of claim 29, wherein said stop bar is at one end of a pivotable bracket provided with an engagement element that engages a cam guide path in a rotary disc.

31. The apparatus of claim 30, wherein the rotation of said rotary disc is synchronized with the movement of the pickup heads.

* * * * *